United States Patent
Fest et al.

(10) Patent No.: US 7,525,657 B2
(45) Date of Patent: Apr. 28, 2009

(54) SYSTEM AND METHOD FOR ACTIVE OPTICAL TARGET DETECTION WITH POLARIZED RECEIVER

(75) Inventors: Eric C. Fest, Tucson, AZ (US); Ralph H. Shepard, III, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/715,107

(22) Filed: Mar. 7, 2007

(65) Prior Publication Data

US 2008/0218754 A1    Sep. 11, 2008

(51) Int. Cl.
*G01J 4/00* (2006.01)
(52) U.S. Cl. .................... 356/369; 356/364; 356/365
(58) Field of Classification Search ......... 356/364–369; 102/201, 211, 213, 214
See application file for complete search history.

(56) References Cited

U.S. PATENT DOCUMENTS

| | | | | |
|---|---|---|---|---|
| 4,306,809 A | * | 12/1981 | Azzam | 356/368 |
| 5,142,140 A | * | 8/1992 | Yamazaki et al. | 356/338 |
| 5,322,017 A | * | 6/1994 | Witt et al. | 102/213 |
| 5,334,831 A | * | 8/1994 | Maurice | 250/227.17 |
| 5,775,636 A | * | 7/1998 | Vig et al. | 244/3.24 |

* cited by examiner

*Primary Examiner*—L. G Lauchman
*Assistant Examiner*—Iyabo S Alli
(74) *Attorney, Agent, or Firm*—John J. Horn

(57) ABSTRACT

A receiver including an analyzer and a detector coupled to the output of the analyzer. The analyzer selects a polarized component of a return beam for input to the detector. The analyzer may be linear, circular or elliptical. Coupled with a laser adapted to output a polarized beam, the receiver provides an active optical target detector. An arrangement may be included for compensating for rotation and ellipticity in the returned beam. In one embodiment, the arrangement for compensating for rotation of the orientation of linear polarization in the returned beam includes a Faraday rotator positioned between the transmitter and the analyzer. An arrangement is disclosed for varying the rotation in the returned beam using a Faraday rotator until a maximum transmittance is achieved. In an alternative embodiment, the arrangement for compensating for ellipticity in the returned beam includes an electro-optical modulator positioned between the transmitter and the analyzer. In another alternative embodiment, two electro-optical modulators are included to compensate for any change in the polarization state in the returned beam.

11 Claims, 7 Drawing Sheets

SYSTEM AND METHOD FOR ACTIVE OPTICAL TARGET DETECTION WITH POLARIZED RECEIVER

BACKGROUND OF THE INVENTION

1. Field of the Invention

The present invention relates to optics. More specifically, the present invention relates to systems and methods for using laser transmitters and receivers for target detection.

2. Description of the Related Art

For military and other applications, there is a need for a system or method for detecting proximity to a target, surface or other object. Many techniques are known in the art for effecting proximity detection using a variety of technologies. For example, for highly demanding military applications, lasers are currently being used for many range finding and proximity detection applications. Lasers are preferred because the coherency and brightness of laser beams allow for long range and high detection accuracy compared to alternative technologies such as radio frequency and infrared based systems.

For both range finding and proximity detection applications, a beam from a laser transmitter is directed to a target and a reflection thereof is detected by a receiver. For range finding applications, the round trip time of a pulse is measured to determine target range. For proximity detection applications, a more simple detection of a return beam is effective to signal target proximity.

Unfortunately, the signal noise ratio (SNR) of current active optical target detectors (AOTDs) or 'optical fuses' is low. This is particularly problematic with respect to the effect of noise caused by solar energy. The low SNR affects the range, sensitivity and size of the detector when used in a missile application by way of example.

Hence, a need exists in the art for an improved system or method for detecting proximity using a laser transmission and reception scheme.

SUMMARY OF THE INVENTION

The need in the art is addressed by the receiver and method of the present invention. Generally, the transmitted beam is polarized and the inventive receiver includes an analyzer and a detector coupled to the output of the analyzer. When coupled with a laser, the receiver becomes an active optical target detector. The analyzer selects a polarized component of a return beam for input to the detector. The analyzer may be linear, circular or elliptical.

In one embodiment, the arrangement for compensating for the rotation of the orientation of linear polarization in the returned beam includes a Faraday rotator positioned between the transmitter and the receiver. An arrangement is disclosed for varying rotation in the returned beam until a maximum transmittance is achieved. In an alternative embodiment, the arrangement for compensating for ellipticity in the polarization state of the returned beam includes an electro-optic modulator positioned between the transmitter and the receiver. In another alternative embodiment, two electro-optical modulators are included to allow the receiver to be tuned to any input polarization state.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
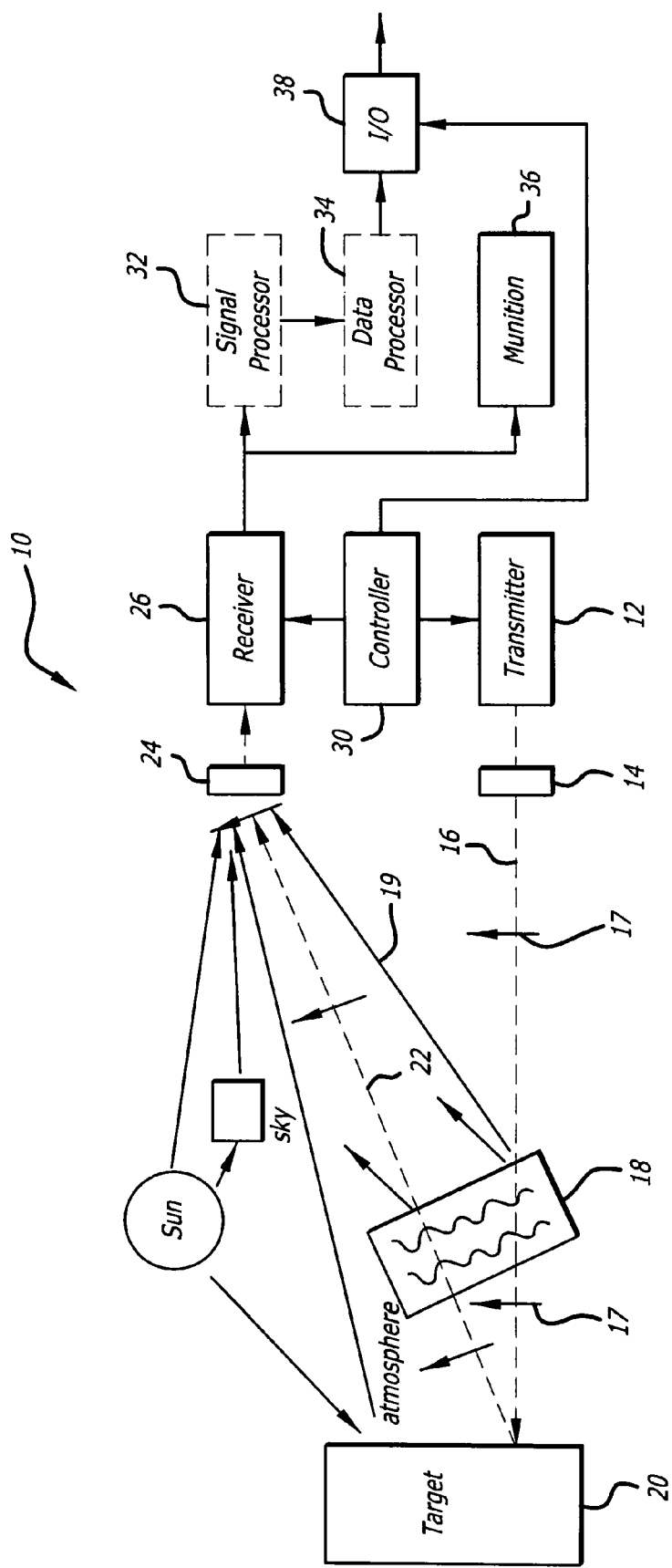
FIG. 1a is a simplified opto-electrical block diagram of an active optical target detector implemented in accordance with an illustrative embodiment of the present teachings.

FIG. 1a is a simplified opto-electrical block diagram of an active optical target detector implemented in accordance with an illustrative embodiment of the present teachings. As shown in FIG. 1a, the system 10 includes a transmitter 12 that outputs a beam 16 of electromagnetic energy. In the preferred embodiment, the transmitter 12 is a laser.

In FIG. 1a, the beam 16 is shown as being vertically polarized as indicated by the arrows 17. This is achieved by rotating the laser until its polarization is vertical. As the beam propagates toward a target 20, it passes through the atmosphere. Dust, smoke, chaff, fog and other particulates in the atmosphere are represented as aerosols 18 which scatter a beam 19 toward the receiver 26. The main beam illuminates the target 20 and a return beam 22 is reflected therefrom. The return beam 22 is also scattered by the atmosphere 18.

In accordance with the present teachings, the return beam 22 illuminates a linear analyzer 24. By design, the polarization of the analyzer 24 is chosen to match the orientation of the linear polarization of the transmitter and hence the polarization of the transmitted and returned beams 16 and 22 respectively. That is, the analyzer has a transmission axis that is aligned with the orientation of the transmitter polarization. The analyzer 24 rejects unpolarized light from the sun directly or as it is filtered or scattered by the atmosphere or light energy that may be of an orthogonal or circular polarization. Those skilled in the art will appreciate that the analyzers may be linear horizontal or circular, as discussed more fully below, without departing from the scope of the present teachings.

On receipt of the polarized return beam 22 via the analyzer 24, the receiver or detector 26 provides an output signal indicating proximity of the target 20. The output of the receiver 26 may be processed by a signal processor 32. In the illustrative military application, the AOTD is an optical fuse adapted to detonate a munition disposed in the warhead of a missile. This is illustrated in FIG. 1*b*.

Figure 1B:
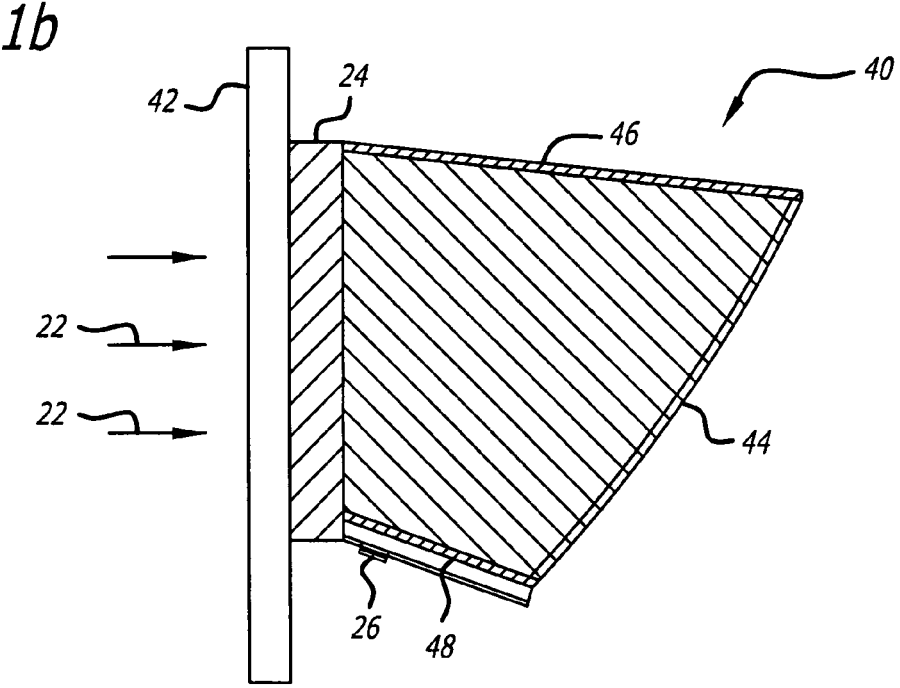
FIG. 1b is a sectional side view showing a prism mounted to the surface of a window of a missile through the polarizer in accordance with the present teachings.

FIG. 1*b* is a sectional side view showing a prism 40 mounted to the surface of a window 42 of a missile through the analyzer 24. The incident return beam 22 is filtered by the analyzer 24 and reflected by a first curved surface 44 to a second surface 46. The second surface 46 reflects the polarized return beam to a third surface 48 on which the receiver 26 is mounted.

Figure 2:
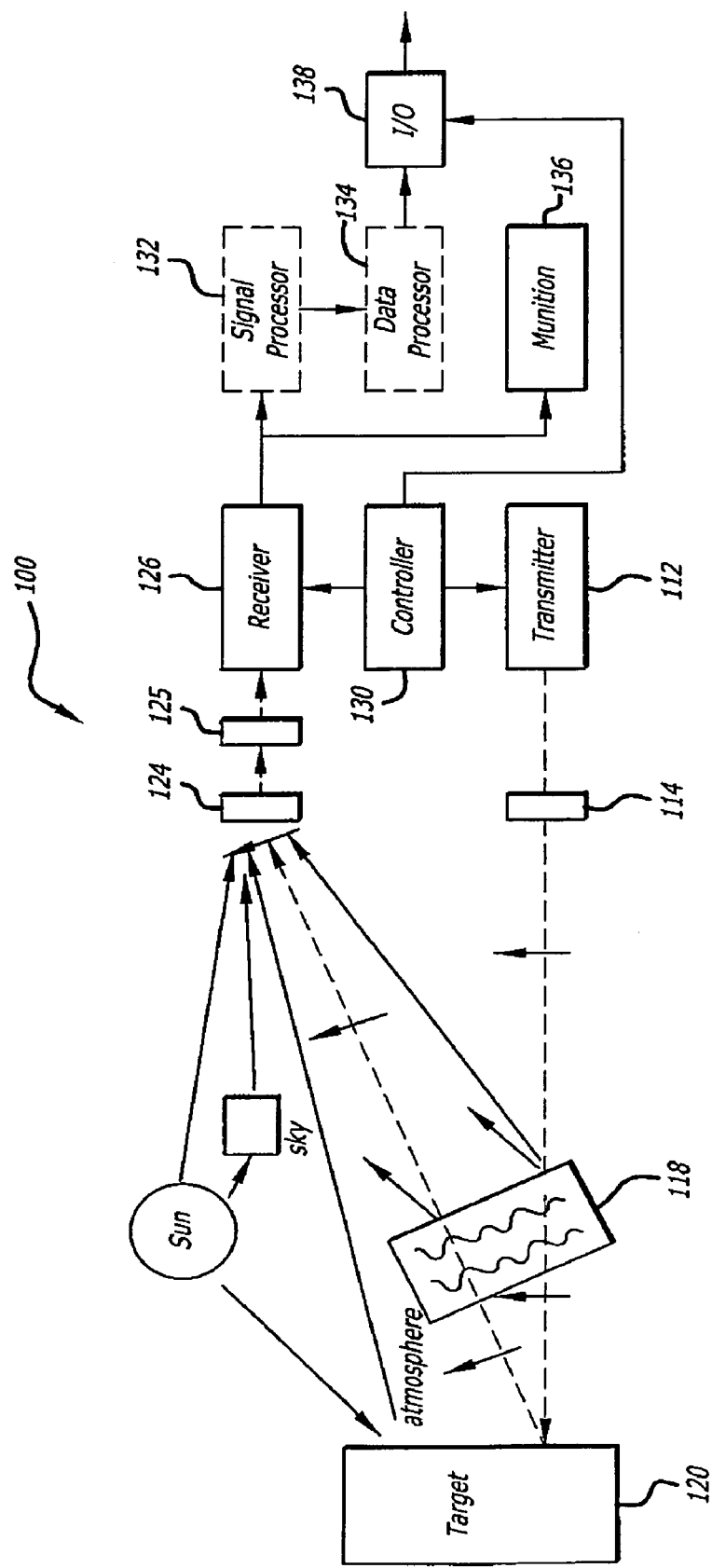
FIG. 2 is a simplified opto-electrical block diagram of a linearly tunable active optical target detector implemented in accordance with the present teachings.

FIG. 2 is a simplified opto-electrical block diagram of a linearly tunable active optical target detector implemented in accordance with the present teachings. A reflection from a target may rotate the orientation of polarization. In certain applications, this may cause the system 10 of FIG. 1 to fail. To address this potential problem, in the linearly tunable polarization embodiment 100 of FIG. 2, a Faraday rotator 124 is mounted in front of the analyzer 125. The rotator 124 allows the system to compensate for any rotation in polarization caused by the target. Power and electronics for control of the rotator 124 are not shown in FIG. 2. The rotator 124 is rotated until a desired (e.g. maximum) transmittance of the return beam is achieved through the analyzer 125. The operation of the embodiment of FIG. 2 is illustrated in FIG. 3.

Figure 3:
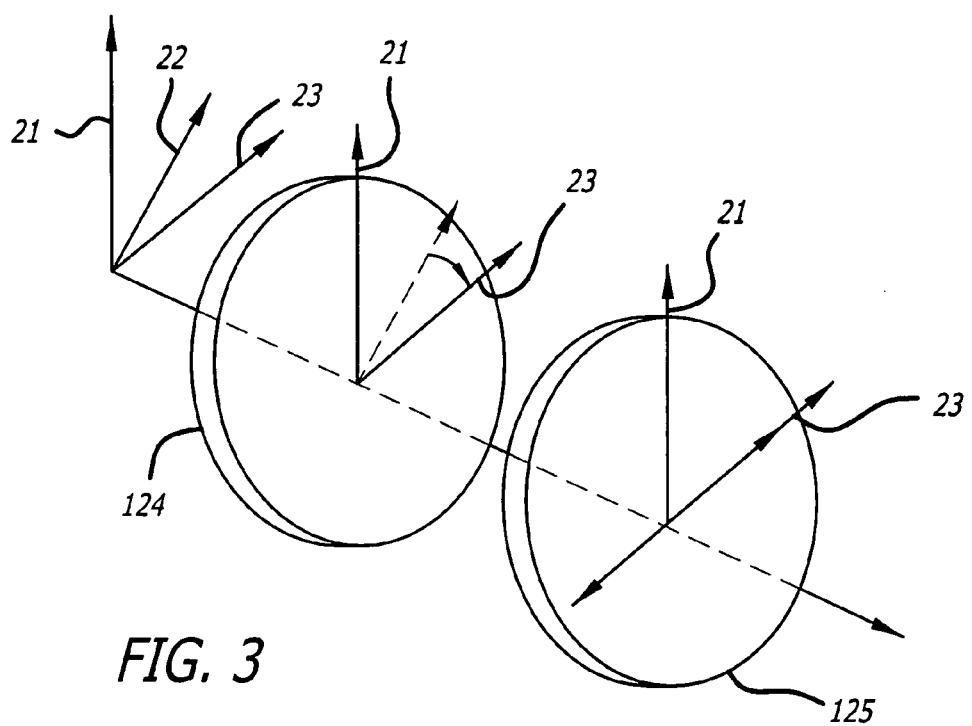
FIG. 3 is an optical schematic that illustrates the operation of the embodiment of FIG. 2.

FIG. 3 is an optical schematic that illustrates the operation of the embodiment of FIG. 2. As shown in FIG. 3, an input beam 22 with a polarization between vertical 21 and horizontal 23 is rotated to horizontal by the Faraday rotator 124. As a horizontal beam, the beam is transmitted by the analyzer 125. An alternate design would put the Faraday rotator at the transmitter 114.

A potential problem with the linear polarized design is that the scatter from the portion of the sky that's 90 degrees from the sun is linearly polarized. A linear analyzer may or may not attenuate this noise source effectively. The alternative embodiment of FIG. 4 addresses this potential problem by using a circular analyzer (or polarizer) instead of the linear analyzer used in FIGS. 1*b* and 2.

Figure 4:
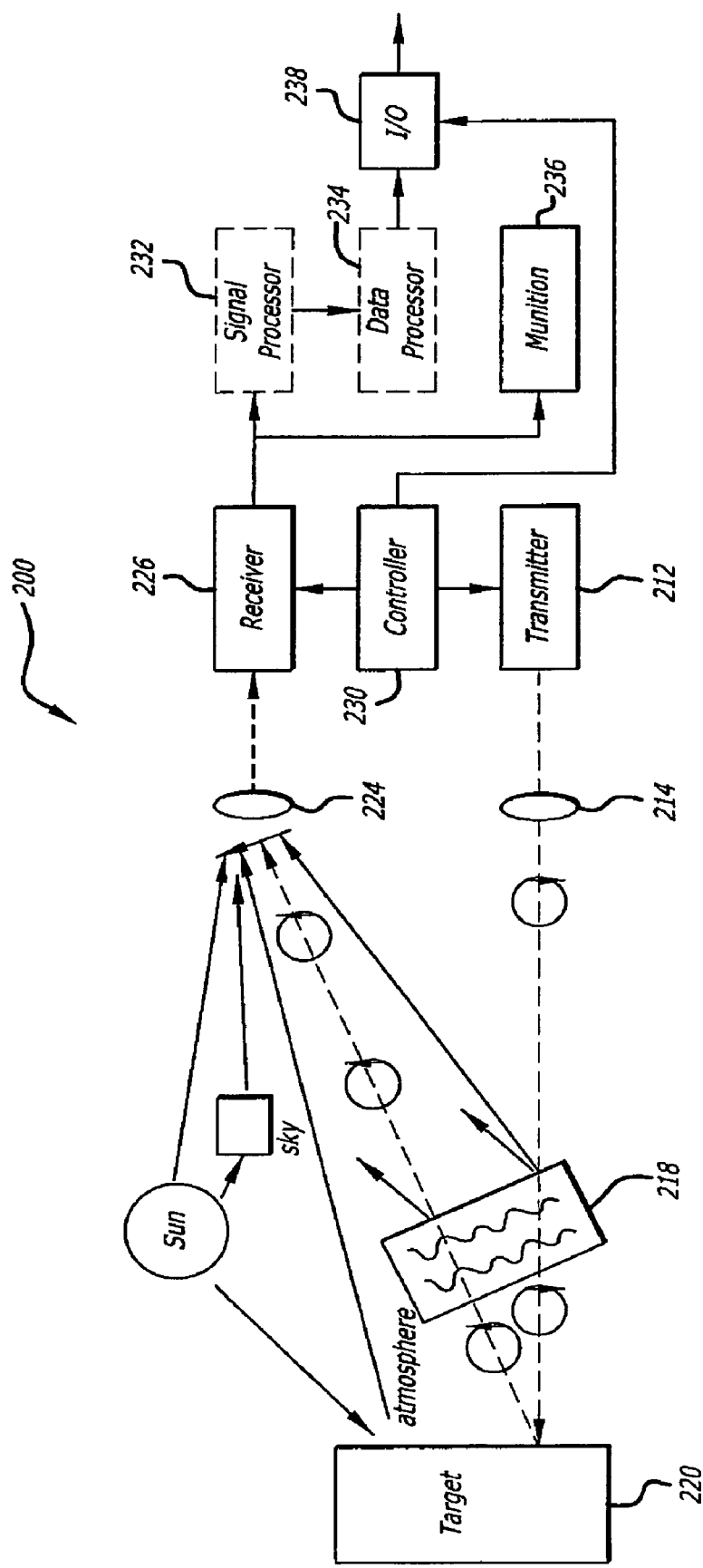
FIG. 4 is a simplified opto-electrical block diagram of an active optical target detector implemented in accordance with an alternative circularly polarized embodiment of the present teachings.

FIG. 4 is a simplified opto-electrical block diagram of an active optical target detector implemented in accordance with an alternative circularly polarized embodiment of the present teachings. Hence, the embodiment of FIG. 4 is identical to that of FIGS. 1*b* and 2 with the exception that the linear polarizers 14 and linear analyzer 24 thereof are replaced with circular polarizer 214 and circular analyzer 224 respectively. The circular polarizer 214 is implemented with a quarter-wave plate and circular analyzer 224 is implemented with a quarter-wave plate and a linear polarizer. The transmitter consists of a laser followed by a spreader lens that spreads the beam out into a fan. In the best mode, the circular polarizer is disposed before spreader lens, as quarter-wave plates do not perform well over a large angular range.

Figure 5:
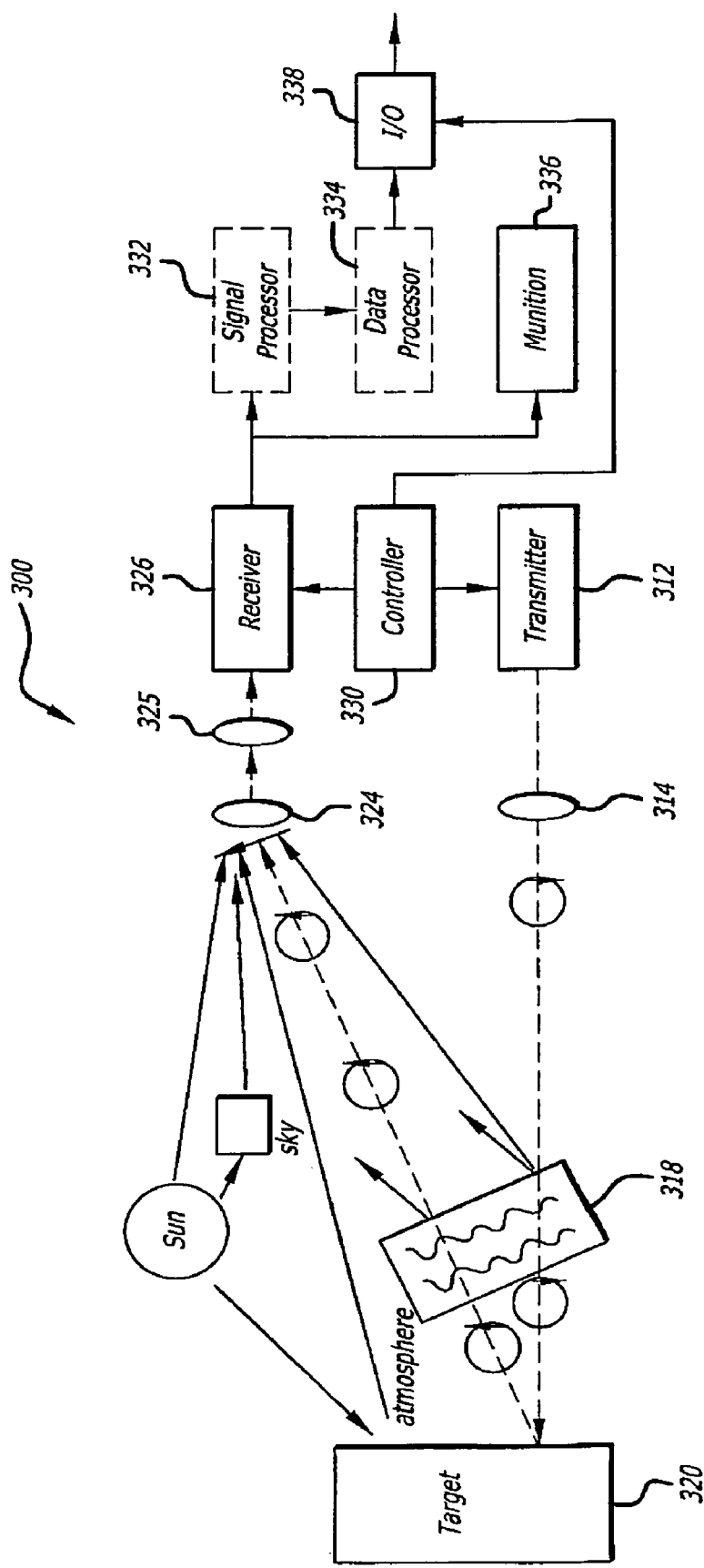
FIG. 5 is a simplified opto-electrical block diagram of a circularly tunable active optical target detector implemented in accordance with the present teachings.

Unfortunately, the return beam may not be completely circularly polarized. That is, it may be slightly elliptical. FIG. 5 is designed to address this potential problem.

Figure 6:
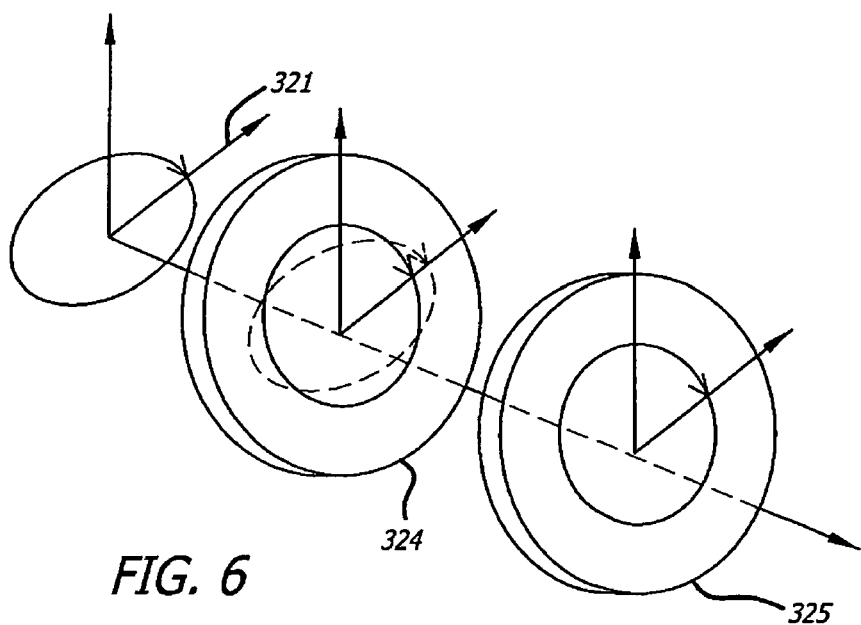
FIG. 6 is an optical schematic that illustrates the operation of the embodiment of FIG. 5.

FIG. 5 is a simplified opto-electrical block diagram of a circularly tunable active optical target detector implemented in accordance with the present teachings. In this embodiment, an electro-optical modulator 324 is positioned in front of the circular analyzer 325 to compensate for any ellipticity induced by the target 320. The modulator 324 induces a variable amount of retardance in the return beam in response to a power supply and control electronics (not shown). The amount of retardance can be varied until a predetermined or maximum transmittance is achieved. The operation of the modulator 324 and circular analyzer 325 of FIG. 5 is illustrated in FIG. 6. An alternate design would put the electro-optical modulator at the transmitter, just after the circular polarizer 314.

FIG. 6 is an optical schematic that illustrates the operation of the embodiment of FIG. 5. As illustrated in FIG. 6, an elliptically polarized input beam 321 is retarded in polarization to right circular by the electro-optical modulator 324. The right circularly polarized return beam 22 is then passed by a right circularly polarized analyzer 325. Those skilled in the art will appreciate that the invention is not limited to the degree or direction of retardation or direction of circular polarization for which the system 300 is optimized.

Figure 7:
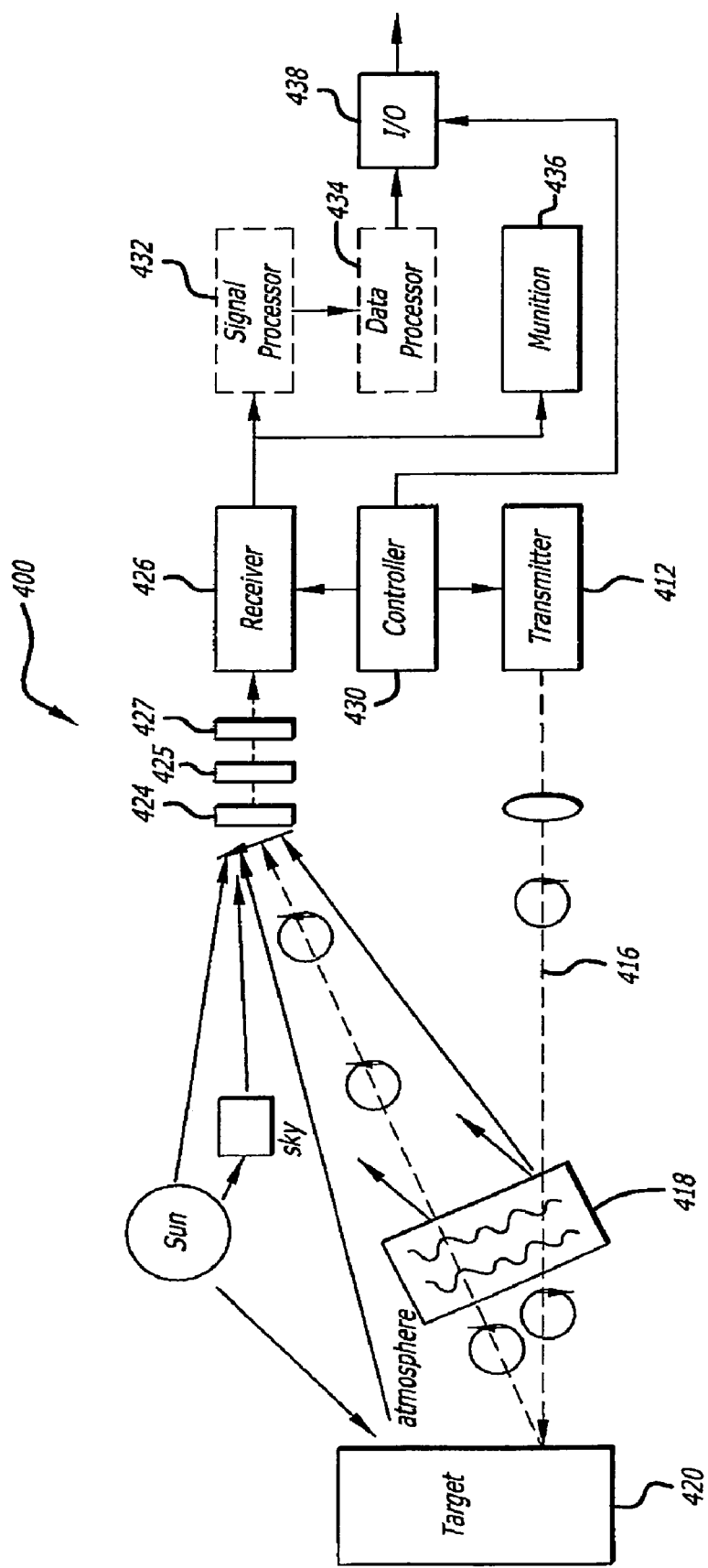
FIG. 7 is a simplified opto-electrical block diagram of a completely tunable active optical target detector implemented in accordance with the present teachings.

FIG. 7 is a simplified opto-electrical block diagram of a completely tunable active optical target detector implemented in accordance with the present teachings. In this embodiment, two electro-optical modulators 424 and 425 are positioned in front of a linear polarizer 427 at the input of the receiver 426 to account for any change in the polarization state of the beam 416 as it is reflected by the target 420. The arrangement of two electro-optic modulators 424 and 425 along with the linear polarizer 427 is a polarization modulation polarimeter. An alternate design would put the electro-optical modulators just after the transmitter 412.

Figure 8:
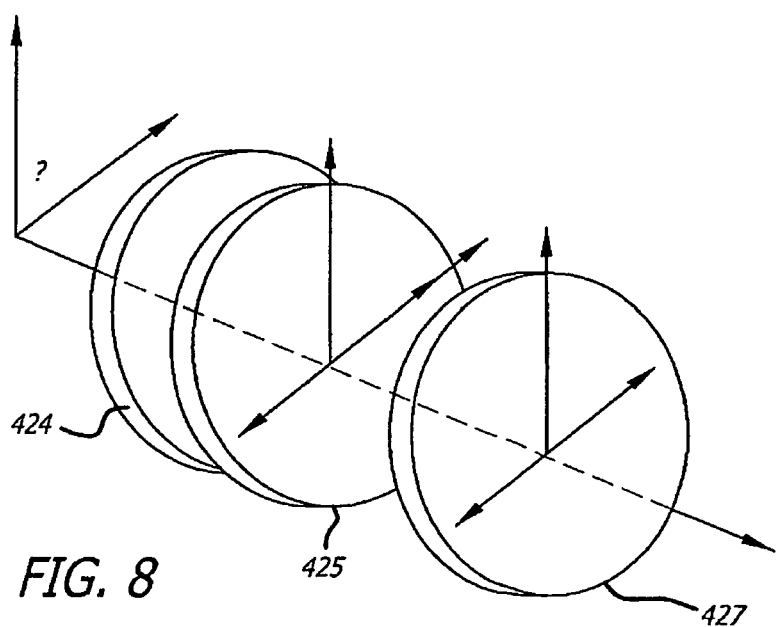
FIG. 8 is an optical schematic that illustrates the operation of the completely tunable active optical target detector of FIG. 7.

FIG. 8 is an optical schematic that illustrates the operation of the polarization modulation polarimeter of FIG. 7. In this implementation, an input beam 422 of any polarization is modulated to horizontal linear by the two modulators 424 and 425. The horizontally polarized beam is then passed by the polarizer/analyzer to the receiver 426. Again, it should be noted that the invention is not limited to the use of a vertical or a horizontal analyzer.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An optical fuse comprising:
an analyzer;
means for compensating for ellipticity and/or rotation in a beam received by said analyzer;
a detector coupled to the output of said means for compensating; and
a munition coupled to said detector.

2. An optical fuse comprising:
a transmitter;
means for polarizing the output of said transmitter;
a receiver adapted to receive signals transmitted by said transmitter;
an analyzer in optical alignment with said transmitter;
means for compensating for ellipticity and/or rotation in a beam input to said analyzer; and
a munition coupled to said receiver.

3. An active optical target detector comprising:
a laser;
a detector mounted to receive a return of a beam transmitted by said laser and reflected by a surface an analyzer for the input to said detector;
polarizer means mounted between said laser and said detector for polarizing the output of said laser;

an analyzer in optical alignment with said detector;
means for compensating for ellipticity and/or rotation in a beam received by said analyzer; and
a munition coupled to said detector.

4. The invention of claim 3 wherein said analyzer is linear.

5. The invention of claim 3 wherein said analyzer is circular.

6. The invention of claim 3 wherein said means for compensating for ellipticity in said returned beam includes a first electro-optical modulator positioned between said transmitter and said analyzer which changes the retardance of the beam.

7. The invention of claim 6 further including means for varying retardance in said returned beam.

8. The invention of claim 7 wherein said means for varying retardance includes means for varying retardance until a maximum transmittance is achieved.

9. The invention of claim 6 wherein said means for compensating for rotation in said returned beam includes a first Faraday rotator positioned between said transmitter and said analyzer which changes the rotation of the beam.

10. The invention of claim 6 further including two electro-optical modulators positioned between said transmitter and said analyzer.

11. A method for detecting proximity including the steps of:
illuminating an object with a pulse of electromagnetic energy;
receiving a reflection of said pulse from said object;
analyzing said received reflection;
compensating for ellipticity and/or rotation in a beam received by said analyzer;
electrically detecting the polarized reflection received from said object to provide an indication of the proximity of said object; and
detonating a munition in response to said indication of proximity of said object.

* * * * *